Sept. 24, 1963 J. J. DICKSON 3,105,026
FUEL ELEMENT FOR NUCLEAR REACTORS
Filed Aug. 26, 1958 7 Sheets-Sheet 1

INVENTOR.
JAMES J DICKSON
BY
ATTORNEY

Sept. 24, 1963 J. J. DICKSON 3,105,026
FUEL ELEMENT FOR NUCLEAR REACTORS
Filed Aug. 26, 1958 7 Sheets-Sheet 2

INVENTOR.
JAMES J. DICKSON
BY
ATTORNEY

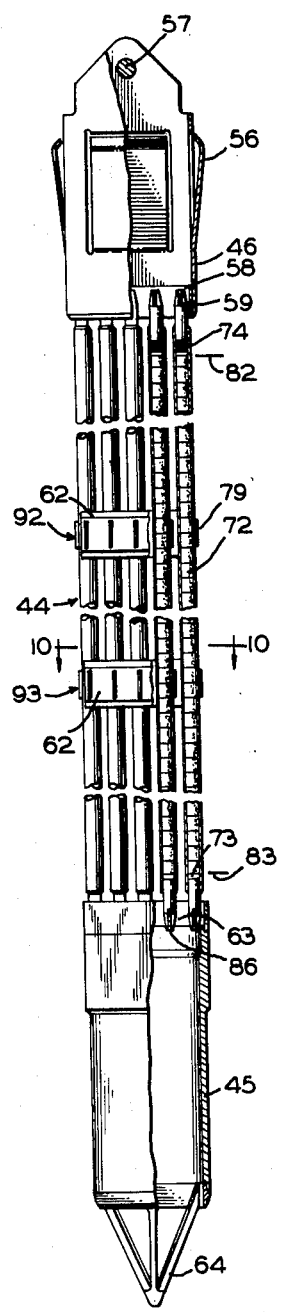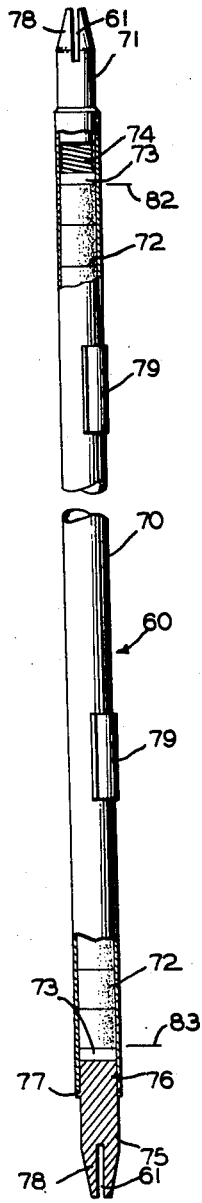

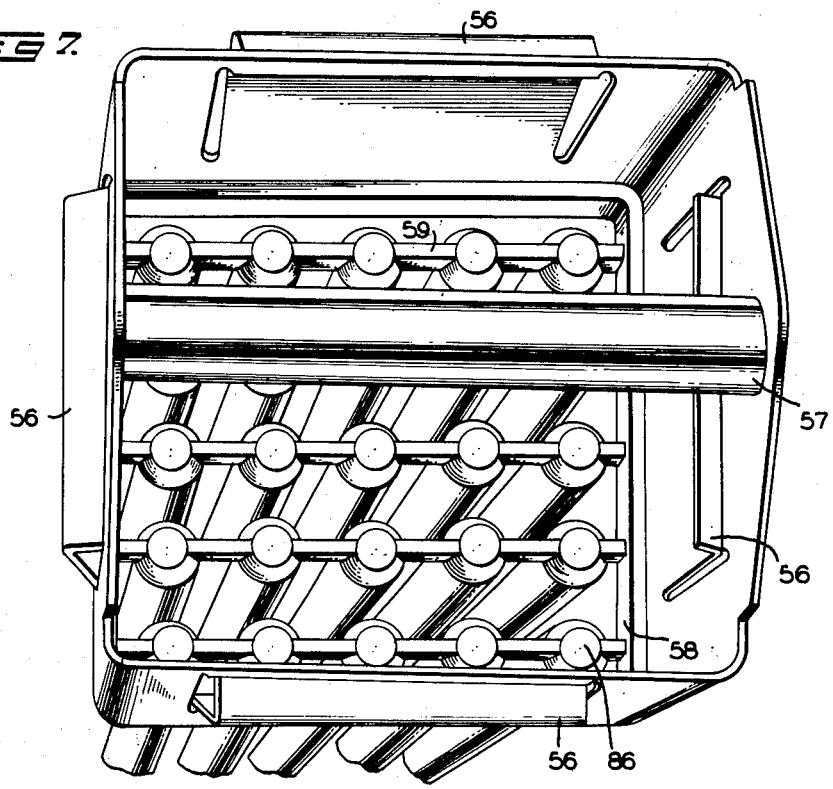
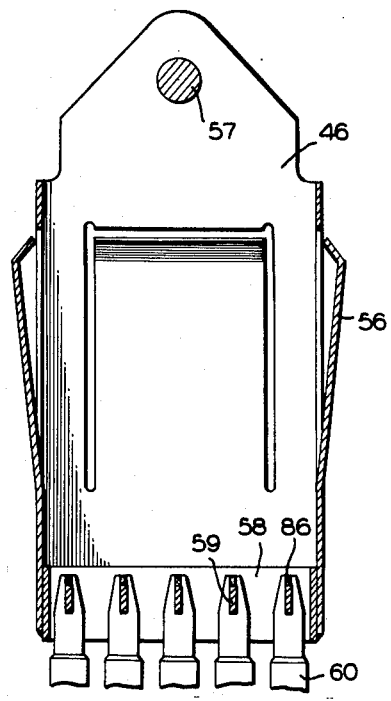

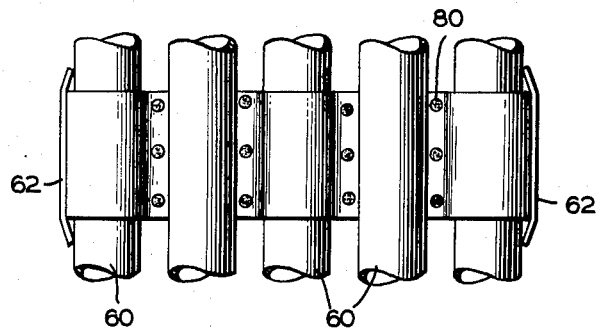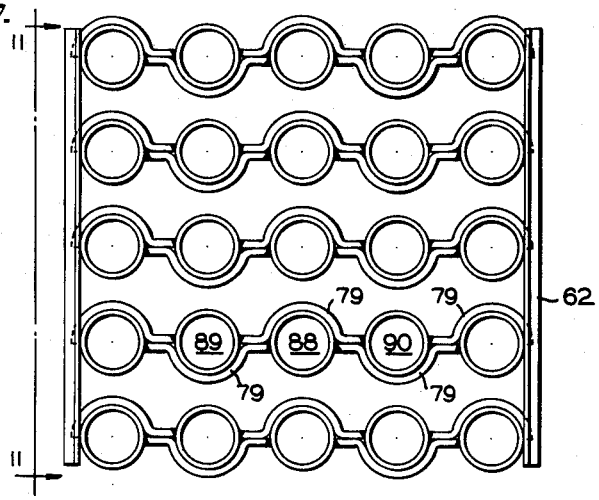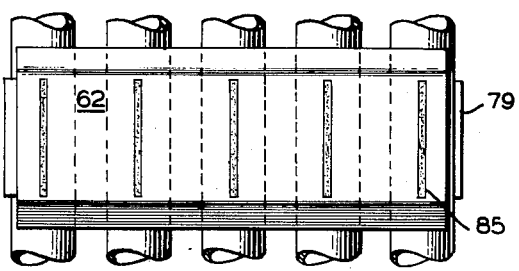

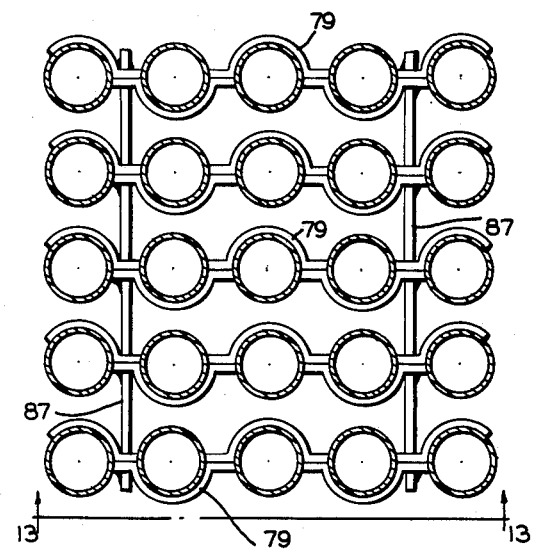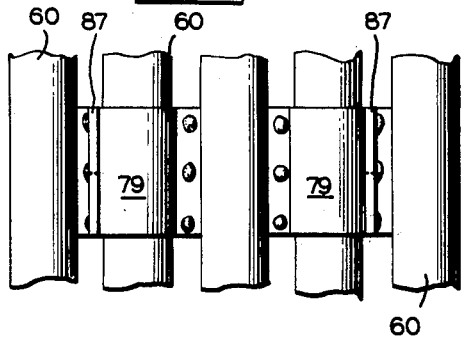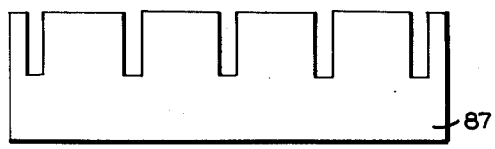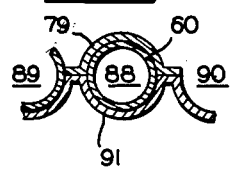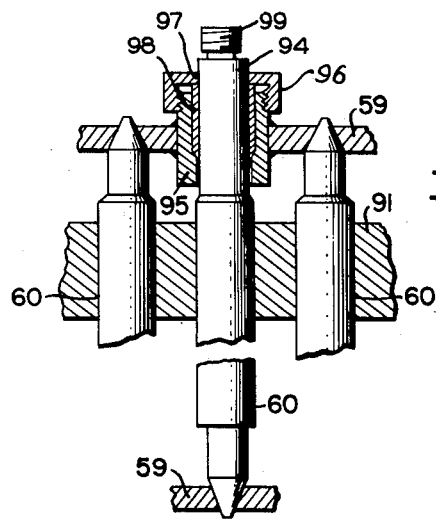

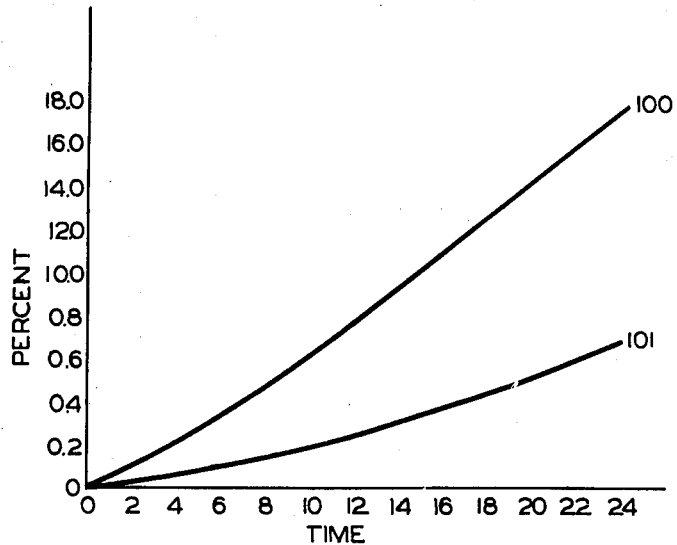
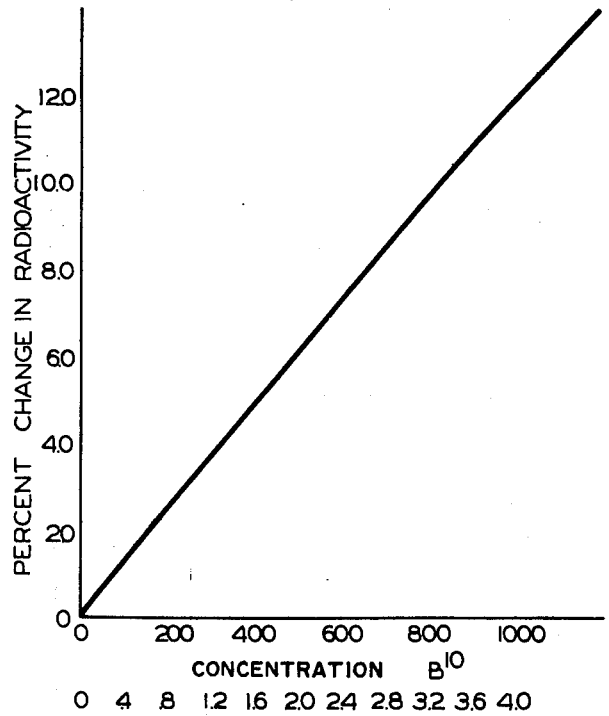

United States Patent Office 3,105,026
Patented Sept. 24, 1963

3,105,026
FUEL ELEMENT FOR NUCLEAR REACTORS
James J. Dickson, Silver Spring, Md., assignor, by mesne assignments, to the United States of America as represented by the United States Atomic Energy Commission
Filed Aug. 26, 1958, Ser. No. 757,381
5 Claims. (Cl. 204—193.2)

The present invention relates to nuclear reactors and more particularly to fuel elements utilized in nuclear reactors.

One of the primary difficulties with the fuel elements generally utilized in the heterogeneous nuclear reactors of the prior art is the large amount of structure material associated with fuel element to provide structure support and fuel element stability during operation. The fundamental considerations in the design of fuel elements is twofold: they must have a long lifetime to reach the high burn-up of core atoms generally considered necessary to make an economically feasible power producing reactor, and the required strength, irradiation stability and integrity must be attained with a minimum of absorbing material in the core, clad and associated parts.

Thus, it has been the practice heretofore, to provide a fuel element having integral side and fuel plates where the side plate is perforated because of growth, tensile and creep consideration. Such a fuel element is shown in ANL–5607 entitled "The EBWR—Experimental Boiling Water Reactor (Nuclear Technology Series of the U.S. Atomic Energy Commission)," May 1957, the disclosure of which is incorporated herein and made a part hereof.

It is apparent from pages 23 through 30 of ANL–5607 that the fuel is surrounded by a large amount of structural material. Such excessive materials have the effect of poisons within the critical region of the reactor, since they absorb neutrons which could otherwise be used in the fission process. Further, fuel assemblies of that type have increased weight, necessitating heavier supporting materials adjacent the core. It is equally apparent that since the fuel plates are clad and then welded to side plates, that inspection of the final assembly for defects in the cladding is very difficult.

Thus, for example, the standard fuel element of the "EBWR" shown in the above-referenced report, has about 28 pounds of structural material in the core length per assembly whereas the fuel element of the preferred embodiment contains only about 12 pounds of structural material in the core length per assembly. Further, the preferred embodiment is 9 inches longer than the standard element, although the length may be varied to suit the particular need.

The present invention utilizes fuel pellets canned in tubes, constructed of stainless steel, zirconium or equivalent material, and therefore markedly reduces the cost over the standard roll-bonded ziconium-clad plates.

It should be noted that the same critical mass is required with the fuel elements of the preferred embodiment of the present invention as is required in the EBWR, although the preferred fuel elements are constructed of stainless steel which is not only stronger but cheaper than zirconium. However, if zirconium can be used in the particular reactor design a decrease in the critical mass of about 10% can be accomplished by the use of the design of the preferred embodiment. Thus the present invention provides a fuel element assembly which gives increased strength without increasing the critical mass and if zirconium is used as the structural material can give a critical mass saving of about 10% with essentially the same strength as the prior art reactor.

Sintered oxide pellets as used in the present invention are generally more resistant to fission damage than metal alloys, and will function properly to at least about 15,000 megawatt days per ton of oxide. This pellet-type fuel element also has operational stability with reference to vibration, since no detectable vibration in clusters of 2 foot rods at flow rates up to 32 feet per second was found, which flow rate is considerably higher than flow rates generally experienced in boiling water reactors. Further, the fuel element of the present invention is also dimensionally stable although there has been a reduction of more than one-half in the structural material over prior art elements.

It is, therefore, an object of the present invention to provide a fuel element for a nuclear reactor which has a minimum of structural material adjacent or surrounding the fuel.

It is a further object to provide a fuel element for a nuclear reactor which is comprised of subassemblies which can be fully individually leak-tested prior to assembly into a fuel element.

It is a further object to provide a fuel element for a nuclear reactor which provides for thermal and radiation expansion without affecting the structural integrity of the fuel element or assembly.

It is another object of the present invention to provide a method and apparatus for reducing the extraneous poisoning material in the core of a nuclear reactor and thereby increasing neutron usage and efficiency of the critical region.

It is a still further object of the present invention to eliminate the need for both cladding and independent structural support in a fuel element.

These and other objects of the present invention will be more apparent from the following detail specification and drawings, hereby made a part of the specification, in which:

FIG. 3 is a perspective view of an assembled fuel element of the present invention.

FIG. 4 is a partially sectioned view of the fuel element of FIG. 3.

FIG. 6 is a perspective view of the bottom of the fuel element of FIG. 3.

FIG. 7 is a perspective view of the top of the fuel element of FIG. 3.

FIG. 8 is a sectional view of the top fuel handling fitting and the element holding grid.

FIG. 9 is a detail view of the side tube spacer and support utilized in the fuel element of FIG. 3.

FIG. 10 is a section view of the fuel element along 10—10 of FIG. 4.

FIG. 11 is a detail view of the side plate of the fuel element of the present invention taken along line 11—11 of FIG. 10.

FIG. 12 is a sectioned view of the second embodiment of the present invention showing the internal space.

FIG. 13 is a detail view along line 13—13 of FIG. 12.

FIG. 14 is a detail view of the spacer utilized in the array of FIG. 12.

FIG. 15 is a detail section of a fuel element array showing the removable poison containing element.

FIG. 16 is a sectioned view of the upper fuel pin holder for the removable poison containing element.

FIG. 17 is a graph of the percentage build-up of $U^{233}$ atoms vs. operating time at full power.

FIG. 18 is a graph of the percent change in reactivity vs. $B^{10}$ concentration.

Figure 1:
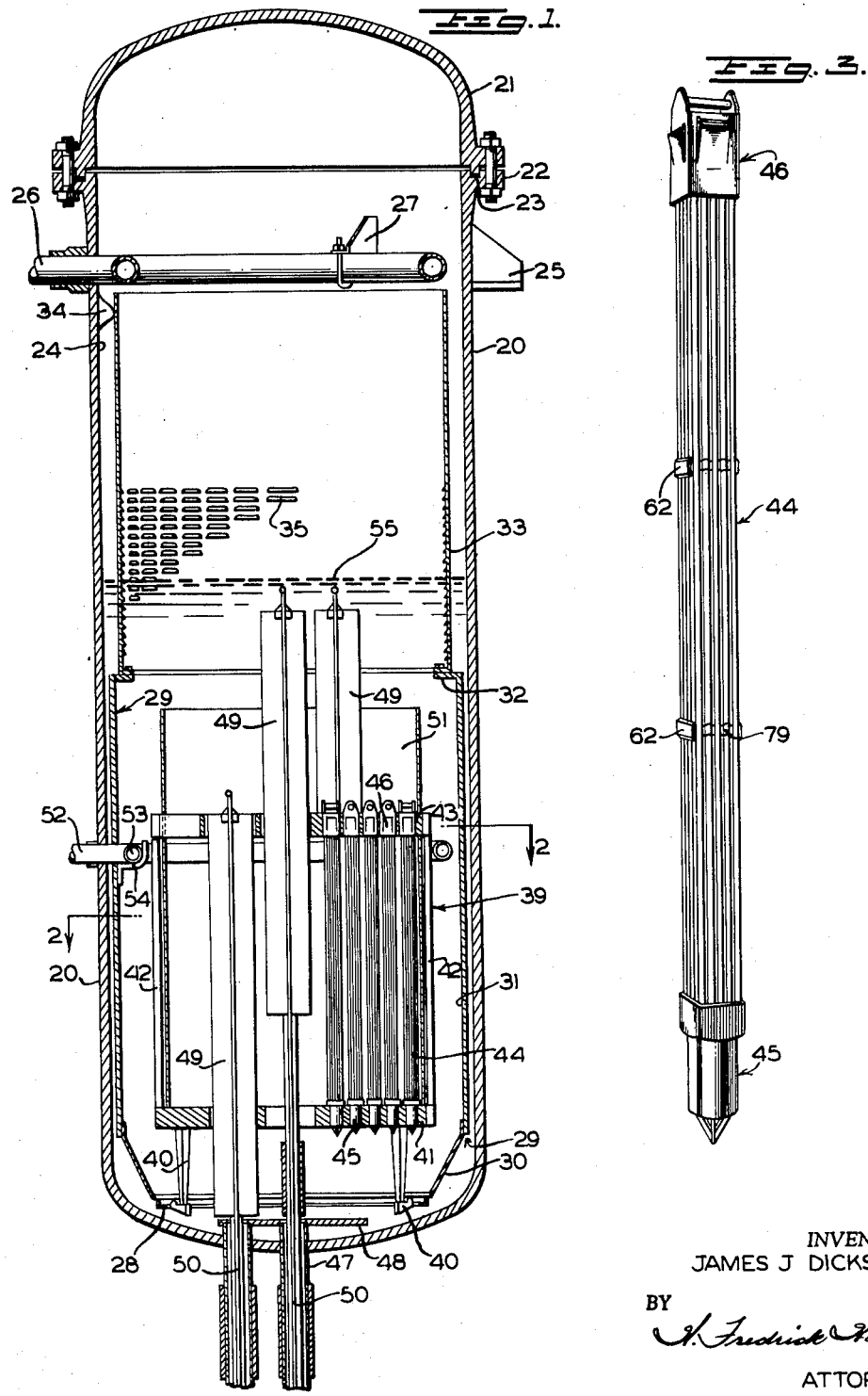
FIG. 1 is a sectional view of a nuclear reactor utilizing the fuel elements of the present invention.

The following dimensional data and reactor characteristics are approximate and are included as an example of a reactor utilizing the fuel elements of the present invention.

REACTOR CHARACTERISTICS
[Preferred embodiment]

A. Fuel requirements (15 months' continuous operation):

| | Kgm. |
|---|---|
| Cold clean critical mass | 90.0 |
| Temperature and voids | 18.0 |
| Fuel burnup | 34.2 |
| Burnable poisons | 8.6 |
| Equilibrium xenon on samarium | 8.2 |
| Fuel required | 159.0 |
| Less $U^{233}$ buildup equivalent | [1]11.0 |
| Total $U^{235}$ loading | 148.0 |

[1] $U^{235}$.

B. Control requirements:

| Reactivities at startup | Mass Kgm. Added | Reactivity $\Delta k/k$ (Percent) |
|---|---|---|
| Temp. and void for 68 F. to 531 F., 0 to 18% void | 18.0 | 5.64 |
| Fuel burnout (1.3 g. per mwd., 26,325 mwd.) | 34.2 | 10.71 |
| Fission product poisons | 8.6 | 2.69 |
| Equilibrium Xenon and Samarium | 8.2 | 2.57 |
| $U^{233}$ production equivalent | −11.0 | −3.45 |
| | 58.0 | 18.16 |

C. Poisons (at end of core life):

| | Percent reactivity |
|---|---|
| Fission product poisons | 2.7 |
| Samarium poisons | 0.6 |
| Xenon poisoning | 2.0 |
| Maximum xenon after shutdown | 2.9 |

D. Uranium 233 buildup: (Atoms $U^{233}$/atoms $U^{235}$), percent

| | |
|---|---|
| One year operation | 7.8 |
| End of core life (15 mos.) | 10.1 |
| Reactivity worth of $U^{233}$ at end of core life | 3.5 |

E. Reactivity coefficients:
Mass coefficient—
  Hot critical _____ 0.22 $\Delta k/k$ per kgm.
  End of core life _____ 0.34 $\Delta k/k$ per kgm.
Temperature coefficient—Cold to operating _____ $9.6 \times 10^{-3}$ $\Delta k/k$ per °C.

Void coefficient—At operating temperature _____ $-1.444 \times 10^{-2}$ $\Delta k/k$ percent void.

F. Percent of materials in core:

| Material— | Percent by volume |
|---|---|
| Steel | 5.9 |
| Void | .4 |
| Zr | 4.1 |
| $H_2O$ | 67.1 |
| Fuel ($UO_2 + ThO_2$) | 22.5 |
| | 100.0 |
| Water/metal | 2.07 |
| Water/fuel ($UO_2 + ThO_2$) | 2.98 |

G. Miscellaneous:
Average thermal flux in core—
  Clean operating core (58.5 mw.) _____ $1.19 \times 10^{13}$ n/cm.$^2$/sec.
  End of core life (58.5 mw.) _____ $1.55 \times 10^{13}$ n/cm.$^2$/sec.
Volume fraction of $UO_2$ to $ThO_2$—
  At startup _____ 3.79.
  At end of core life _____ 2.91.
Percent burnup of $U^{235}$ (15 mos.) _____ 23.1.
Conversion ratio—
  At startup _____ 0.47.
  At end of core life (15 mos.) _____ 0.55.

H. Dimensional data:
Fuel elements—
  Tube, I.D. _____ 0.410″.
  Tube wall thickness _____ 0.020″.
  Thoria-urania pellet diameter _____ 0.407″.
  Total effective pellet length _____ 5 feet.
  Number of rods per element _____ 25.
  Total number of fuel elements _____ 148.
  Total number of rods _____ 3700.
  Pellet composition _____ thoria × at least 90% enriched U.
  Thoria density _____ 95% theoretical.
  Urania density _____ 95% theoretical.
  Steel tube composition _____ 304 stainless steel ELC.

PERFORMANCE CHARACTERISTICS

Heat absorbed in boiling _____ $173 \times 10^6$ B.t.u./hr.
Heat absorbed in heater water _____ $24.8 \times 10^6$ B.t.u./hr.
Total _____ 197.8 B.t.u./hr. (58.2 mw.)

B. Core:
Reactor power (thermal-working) _____ 58.8 mw.
Average power density in coolant _____ 39.6 kw./liter.
Average inlet velocity _____ 4.05 ft./sec.
Average Reynolds No. _____ 320,000.
Average exit quality _____ 0.036.
Average exit void fraction _____ 0.312.
Average void fraction over boiling water _____ 0.237.
Average void fraction in core _____ 0.192.
Average heat flux _____ 89,800 B.t.u./hr. ft.$^2$.
Total steam rate _____ 258,000 lb./hr.
System pressure _____ 875 p.s.i.g.
Boiling tempearture _____ 531° F.
Inlet water temperature _____ 528.1° F.
Feedwater return temperature _____ 449° F.

C. Burnup (450 day operation):
Average metal atom percent burnup _____ 0.815
Average total atom percent burnup _____ 0.271
Average mwd./ton (thoria and urania) _____ 5,870
Max. metal atom percent burnup _____ 2.82
Max. total atom percent burnup _____ 0.938
Max. mwd./ton (thoria and urania) _____ 20,200

D. Fuel pin performance:
Average flux environment—
  Heat flux _____ 89,800 B.t.u./hr. ft.$^2$.
  Boiling fluid temp. _____ 531° F.
  Stainless steel outside surface temp. _____ 545° F.
  Stainless steel inside surface temp. _____ 560° F.
  Surface temp. of thoria-urania pellet _____ 1,396° F.
  Center temp. of thoria-urania pellet _____ 1,830° F.
  Compressive stress in S.S. tube _____ 9,820 p.s.i.
  Thermal stress in S.S. tube _____ 2,520 p.s.i.
Maximum flux environment—
  Heat flux _____ 310,000 B.t.u./hr. ft.$^2$
  Boiling fluid temp. _____ 531° F.
  Stainless steel outside surface temp. _____ 566° F.

| | |
|---|---|
| Stainless steel inside surface temp. | 618° F. |
| Surface temp. of Th–U pellet | 1,421° F. |
| Center temp. of Th–U pellet | 3,420° F. |
| Compressive stress in S.S. tube | 4,910 p.s.i. |
| Thermal stress in S.S. tube | 8,700 p.s.i. |
| Yield strength, 304 ELC, S.S. | 14,000 p.s.i. |

The reactor vessel utilizing the fuel elements of the present invention is shown in FIG. 1, and may be utilized in the power producing system described in the above-referenced report ANL–5607.

The fuel elements of the present invention are described in particularity with respect to a boiling water type reactor but are useful in many other types of reactors, and are particularly adapted for use in those reactors known in the art as pool and tank type reactors.

*Reactor*

Referring now to FIG. 1, a reactor pressure vessel 20 is shown having a flanged top pressure dome 21 sealed to an upper flange 22 by means of seal 23 and bolts or equivalent means. The interior of the vessel has a 3/32" thick lining 24 of stainless steel. A plurality of reactor vessel support lugs 25 are integrally attached around the upper periphery of the pressure vessel 20. A steam outlet pipe 26 passes through the vessel 20 and is welded to the vessel wall. The steam outlet pipe 26 is supported within the vessel 20 by a plurality of supporting brackets 27 welded or otherwise integrally attached to the interior surface of the vessel. The steam outlet pipe 26 is provided with a plurality of openings (not shown) in its surface within the vessel to provide a passageway for steam.

A core shroud seating ring 28 is welded or otherwise integrally attached to the inner bottom surface of the pressure vessel 20 and supports a thermal shield indicated generally as 29. The thermal shield 29 fabricated of one inch thick stainless steel containing one percent boron has a bottom conical portion 30 which supports the cylindrical upper portion 31 which is spaced one inch from the interior surface of the pressure vessel 20. The upper portion of the thermal shield has a radially inwardly extending flange 32 to which is bolted an upwardly extending cylindrical shock shield 33 which is supported slidably for vertical expansion and rigidly supported against lateral movement by supports 34. The shock shield 33 is provided with a plurality of apertures 35 to permit fluid flow between the interior of the shock shield and the volume between the shock shield and the vessel wall.

A plurality of core support legs 40 are integrally attached to the bottom interior surface of the vessel 20 and support a bottom grid plate 41. Extending upwardly around the periphery of and integrally attached to the bottom grid plate 41 are the lifting rods 42. Attached to the upper portion of the lifting rods is a spider or upper guide grid 43. The fuel elements 44 are inserted through the upper guide grid and have a locating end fitting or lower fuel guide adapter 45 which fits into the bottom grid plate and an upper fuel handling fitting or adapter 46 which fits into the upper guide grid 43.

The core indicated generally as 39 is centered in the pressure vessel 20 and has a surrounding annular volume, between the core and thermal shield, which serves as a downcomer for coolant circulation.

The core has spaces for 164 fuel elements in the lower grid plate and under normal conditions 148 of these are occupied by elements. The active core height is 60 inches and the active radius is 28.45 inches. The core is reflected on all sides by about 10.5 inches of water.

Control rod thimbles 47 are provided in the bottom of the vessel 20 which are sealed to the vessel 20 and terminate in a control rod guide plate 48. The control rods 49 are vertically movable by means of connector rods 50 which are attached to actuating mechanisms not shown.

Nine control rods are utilized giving 15 percent reactivity control. Additional excess reactivity may be obtained by using burnable poisons built into the core of the reactor. For example, to obtain an additional 8.2 percent excess reactivity requires $2.7 \times 10^{-4}$ grams of boron 10 per cubic centimeter of core. As is described hereinafter, this burnable poison may be included in the fuel elements.

Extending upwardly from, and supported by the upper grid 43, is a control rod guide and core shroud 51 which terminates adjacent to the upper flange 32 of the thermal shield 29.

A feed water inlet pipe 52 passes through and is welded to the vessel 20 at a position near the top of the fuel elements 44. The pipe 52 extends around the interior of the vessel 20 and has a plurality of apertures (not shown) for the passage of feed water into the vessel 20. The feed water ring 53 formed by the inlet pipe is supported by brackets 54 attached to the thermal shield 29.

During normal operation the water level within the vessel 20 is in the approximate position indicated as 55. The operation of the reactor as well as details of the associated equipment are well known in the art as is apparent from the above-referenced report ANL–5607.

Figure 2:
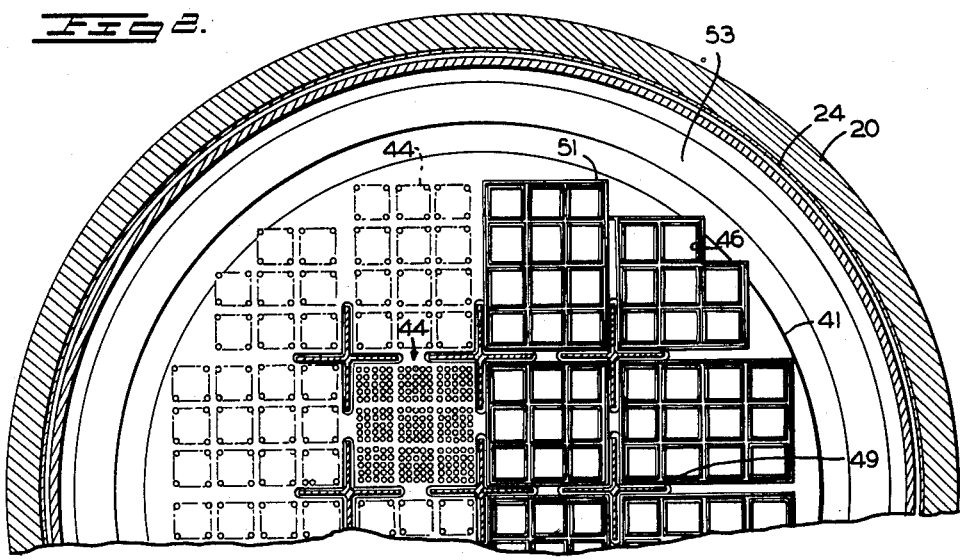
FIG. 2 is a sectional view along line 2—2 of FIG. 1.

FIG. 2 is a sectional view of FIG. 1 along line 2—2 and shows the relationship and location of the core 39 within the vessel 20. The right hand portion is a section showing the upper fuel element casing, grid, shroud, and control rod. The left hand portion is a section showing the active core region, the fuel element tubes. Each fuel element 44 preferably consists of 25 tubes as described in detail hereinafter, only a portion of these tubes being detailed in FIG. 2.

*Fuel Element*

The fuel element of the preferred embodiment of the present invention indicated as 44 in FIG. 1 is shown in more detail in FIGS. 3 through 16.

Specifically, the fuel element of the preferred embodiment shown in partial section in FIG. 4 consists of an upper fuel handling adapter 46 having spring side members 56 and a lateral lifting bar 57 across its upper opening. Integral with the upper fuel handling adapter, welded or otherwise integrally attached to the lower extremity of this fuel adapter, is an upper support grid 58 having a plurality of cross bars 59 which support the fuel tubes or fuel pins 60 shown in FIG. 5. Fuel pins or tubes 60 in FIG. 5 have a slot 61 at both ends which is welded closed around cross members 59. The plurality of fuel tubes are supported against lateral displacement not only by the weld to the cross member 59 but also by a plurality of tabs 62 as explained in more detail hereinafter. The lower extremity in the fuel tube 60 meshes with the lower fuel rod support grid 63 which is identical with the upper fuel rod support grid 58. The lower extremity is also welded around the slot 61 to the lower fuel rod support grid 63. The lower fuel rod support grid is welded or otherwise integrally attached to the locating end fitting 45 which terminates in an inlet water guide member 64. The arrangement of the fuel tubes in the lower fuel rod support grid and upper fuel rod support grid is more clearly shown in FIGS. 6 and 7. From these figures it is apparent that a minimum of structural material is adjacent to the fuel tubes 60 and that the inlet cooling water passing through the guide 64 has a minimum of obstruction and passes directly along the outside surfaces of the fuel tubes 60. FIG. 7 clearly shows that the outlet area for the cooling water is unobstructed except by the small cross members 59 and the lateral lifting bar 57. FIG. 4 shows that the full length of the fuel tubes 60 is free of extraneous structural supporting material which would absorb neutrons which could otherwise be utilized in the fission process taking place in the reactor. There are provided, however, supporting tabs 62, preferably fabricated of stainless steel, which are approximately 1" wide which support the tubes against lateral displacement as will be apparent hereinafter.

Figure 5:
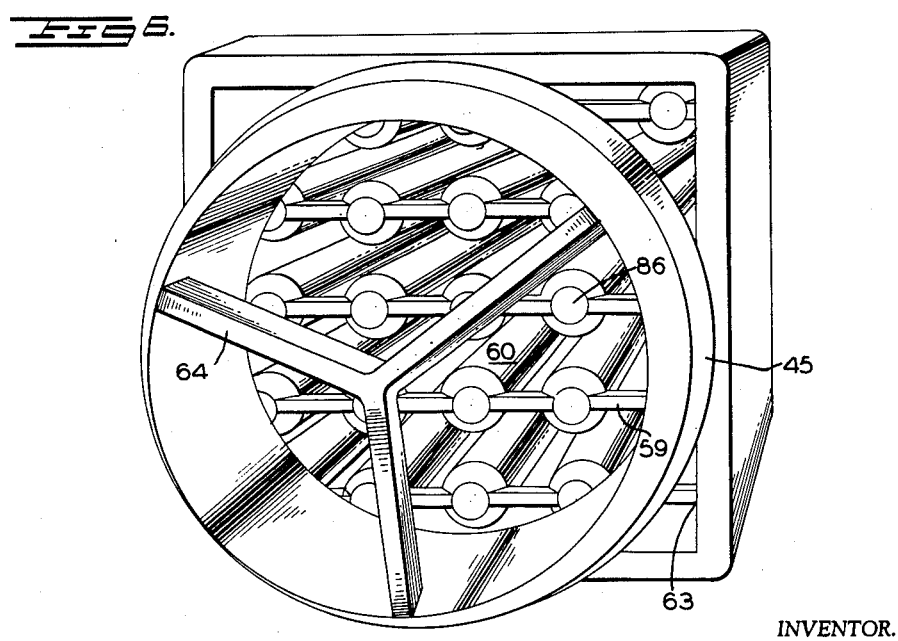
FIG. 5 is a partially sectioned detail view of one of the fuel pins of the fuel element of the present invention.

Referring now to FIG. 5, each of the plurality of fuel tubes or pins 60 is composed of a stainless steel tubular member 70 having an upper end fitting 71 which is Heliarc welded or otherwise integrally attached to the continuous tubular member 70 and has a portion which extends into the tubular member 70 to provide adequate longitudinal alignment and support. Within the tubular member 70 is a plurality of fuel pellets 72, preferably right circular cylinders, separated from the upper end fitting by a refractory material insulator 73, preferably a right circular cylinder, which in turn is resiliently separated from the lower extremity of the upper end fitting 71 by a spring 74. In this manner the fuel pellets 72 are loosely contained laterally but resiliently contained longitudinally within the tubular member 70 so that movement of the fuel element or fuel tube, either during original assembly or actual operation, will not result in chipping or other injury to the fuel pellets 72. Furthermore, this spring while performing the above-described function, also provides a space for the accumulation of fission gases given off during the operation of the reactor, which fission gases are completely contained within the fuel tube.

The lower extremity of the fuel tube 60 has a lower end fitting 75 which is identical to the upper end fitting 71 and has a portion 76 which extends into the tubular member 70, a shoulder 77 which engages the lower extremity of the tubular member 70, and a tapered end portion 78 which contains a slot 61. A second insulator 73, for example magnesium oxide, is placed between the upper extremity of the lower end fitting 75 and the lower most fuel pellet 72. In this manner heat generated within the fuel pellets 72 is insulated from the end fitting 75.

The clips or links 79, preferably fabricated from stainless steel, are nicro-brazed, or otherwise integrally attached, to each of the fuel tubes 60 at approximately one-third and two-thirds the length of the fuel tube 60. These clips have a semicircular center portion and laterally extending end portions, and the entire clip is located on one side of a plane passing along the longitudinal axis of the fuel tube 60 as is apparent from FIG. 10.

The following are the steps in the fuel rod assembly procedure and are directed to FIGS. 9, 10 and 11 so that the method of assembly as well as the physical alignment will be apparent. The tubular members 70 are first cut to the proper length and the lower end fittings 75 is nicro-brazed in its proper position. The two clips 79 are also nicro-brazed in the positions shown in FIG. 5. An insulating pellet 73 is then placed in its position adjacent to the upper surface of lower end fitting 75. The uranium containing pellets 72 are then placed within the tubular member 77 within a dry box containing one atmosphere of helium, so that the volume contained by tubular member 70 is filled with pellets and helium gas at a pressure of 1 atmosphere. A second insulating pellet 73 is placed on top of the fuel pellets 72 and spring 74 is placed on the top insulator pellet 73. The upper end fitting 71 is then placed into the upper opening of the tubular member 70 and the spring 74 is slidably depressed so that shoulder 77 of the upper end fitting 71 is in contact with the upper end of tubular member 70. Upper end fitting 71 is then Heliarc welded to the tubular member 70 thereby completely closing the tube. Each individual tube as shown in FIG. 5 can then be mass-spectroscopically leak detected in a vacuum container. Thus it is apparent that any leaks caused by the welding steps in the above-outlined procedure will be detected long prior to the final assembly of the complete fuel element.

In the preferred embodiment 5 pins are then placed in a fixture clamp in the proper spaced relation with the clips 79 alternating from one side to another as is apparent from FIG. 10. These clips are then spot welded in three places, as indicated by 80 in FIG. 9 for example. This subassembly or group of fuel tubes forming a line, preferably straight, can then be tested again for leaks or damage resulting from the previously described handling procedures. This frequent testing minimizes the danger of an undetected leaking fuel pin being inserted into a reactor with the consequent dangers.

Five rows or groups, each containing five pins, are then assembled, for the preferred embodiment, by means of tabs or side plates 62 which have slots 85 along their surface to accept the end portions of the clips 79. These end portions of the clips 79 are then welded to the side plates 62 thereby forming an assembly in which the groups are equally spaced from each other and the individual fuel tubes within each group are equally spaced from each other.

The upper fuel rod support grid 58 and lower fuel rod support grid 63 are then placed in the slots 61 and welded as at 86. The locating end fitting previously assembled with the inlet water guide member or nozzle 64 is then welded or otherwise integrally attached to the lower fuel rod support grid 63 and the fuel handling fitting 46 previously assembled with lateral lifting bar 57 is welded to the upper fuel rod support grid 58 thereby completing the assembly of the fuel element.

The recovery of the partially depleted, uranium 233 containing pellets is greatly simplified by the arrangement of the present invention. After the fuel element assembly is removed from the reactor and allowed to decay to the desired radiation level commensurate with safe handling procedures, the entire element can be placed in a dry box or hot cell facility and the pellets or other form of fuel easily removed. The removable procedure requires that the tubes be cut by sawing or similar means through the spring 74 and the upper portion 76 of the lower end fitting 75 or other similar positions. In this manner the entire tube bundle is freed from the end fittings 45 and 46. The bundle can then be handled as an independent unit and the pellets forced out one end by the use of a rod, since the entire active height between points 82 and 83 is contained within the bundle. It is important to note in this respect that since the spring 74 is utilized to resiliently hold the pellets against longitudinal movement physical chipping resulting from the above-described assembly or handling procedures is eliminated. Furthermore, since a fluid heat transfer agent is utilized within the tubular portion 70 there is no necessity for machining or chemically dissolving the tube 20 and pellets 72 or chemically dissolving the pellets with a substance which does not attack the tubular portion.

The only problem remaining in extracting the pellets results from radiation growth in the lateral direction. Since it is easy to establish the extent of such growth under the particular operating conditions the clearance between pellets and the inside of the tubular portion can be preselected to eliminate this problem.

In this manner the pellets can be removed from fuel element assembly and the few refractory pellets removed so that the resulting mass of pellets does not contain any extraneous substances which were not originally placed into the tubular portion or which were not formed in the fission-conversion or fission-breeding processes.

The simplification of the spent fuel recovery reduces not only the cost of reclaiming the products but also eliminates at least some of the dangers associated with the use of strong chemical agents in dissolving fuel elements ordinarily associated with plate type fuel elements and many of the prior art fuel elements utilizing tubes. Thus, the geometry and arrangement of the tubes and interconnecting supports of the present invention not only provides for increased strength without increased critical mass but also simplifies fuel recovery as well as increases core efficiency.

In those cases where the externally located tabs or side plates 62 are undesirable because of difficulty in insertion or extraction of individual fuel elements, an alternative procedure shown in FIG. 12 may be used. As is apparent from the inspection of FIG. 12 the assembly of the five groups will be accomplished in the same manner as described above except that the spacer 87 (see FIG. 14) is used instead of the side plates 62 and is located between the first and second rows on each side of the assembly. At this location it is welded to the various clips 79 to form a rigid spacing support. It should also be noted that the clips which are utilized along the outer rows are not full 180° clips. FIG. 13 shows that the spot welding 80 must be properly located so as not to adversely affect the attachment of the spacer 87 to the clips 79. Reference is also made to copending application, Serial Number 757,223, filed August 26, 1958, now Patent No. 3,068,163, entitled Method and Means for Supporting Reactor Fuel Containers in an Assembly, by Edwin L. Currier, Jr., et al., the disclosure of which is incorporated herein by reference.

The assembled fuel element in accordance with the embodiment shown in FIG. 12 is essentially identical to that shown in FIG. 4 except that the spacers 87 are located within the fuel assembly.

Since in many applications it is desirable to have within each fuel element assembly such as shown in FIG. 4 a burnable poison and because of the flat plane construction of the prior art devices this was not possible, if for any reason the burnable poison was to be removed, the modification of FIGS. 15 and 16 are provided. The modification of the present invention as shown in FIGS. 15 and 16 provides an apparatus by which burnable poison may be removably contained within the fuel assembly of FIG. 4. Thus, for example, a tube containing burnable poison could be inserted in position 88 shown in FIG. 10 by including the modifications shown in FIGS. 15 and 16. Specifically, the clips 79 of 89 and 90 would be extended to form a second semi-circular clip 91 and the fuel tube 60 would not be welded to the clip 79 or 91. Thus, while the slot 61 on the lower extremity of the fuel tube 60 would embrace the cross member 59 of the lower fuel rod support grid 63 it would not be welded thereto. Fuel tube 60 would be slidably engaged by clips 79 and 91 at both positions 92 and 93 along the length of tube 60. The upper end fitting 71 would not be used and an end fitting 94 would be substituted. This end fitting 94 is attached to the upper extremity of the tubular member 60 in the same manner as described hereinbefore. Fitting 94 extends upwardly through a circular fitting 95 welded into the proper position in the cross member 59 of the upper fuel rod support grid 58. Circular fitting 95 has a threaded portion on its upper outer surface which engages a nut 96 having a central aperture 97 for the passage of the upper fitting 94. An insert 98 is provided which fits within the circular fitting 95 in a camming or friction arrangement so that when the nut 96 is engaged on the circular fitting 95 the insert 98 is forced downwardly to firmly grasp the fitting 94 and hold it rigidly in place. A threaded portion 99 extends upwardly from the top of fitting 94 so that a tool can be inserted into the reactor which removes the nut 96 and engages the threaded portion 99, so that the burnable poison containing rod 60 can be removed from the reactor without removing the entire fuel element assembly. In this manner it is possible to vary the amount of burnable poison in the reactor at will thereby making it possible to attain higher uranium 235 burn-up percentages and also to maintain more strict control of the neutron flux distribution within the reactor core. Burnable poison compensates for depletion of fissionable material and reduces the amount of excess reactivity which must be overcome by the control rods.

The above described assembly procedure is only slightly modified by the use of a removable poison containing rod as is apparent. The procedure for reclaiming the fuel and fission products of the fuel element is essentially the same as described above except that the poison containing rod is removed prior to any cutting of the fuel tubes and is processed separately.

*Fuel*

In the preferred embodiment each of the stainless steel tubes has a .410″ inside diameter and a .020″ minimum wall thickness. Each fuel tube contains 120 fuel pellets and two thermal resistors and a hold-down spring. Each fuel pellets 72 consists of $UO_2$—$ThO_2$ solid solution compound. The thorium contained in the fuel pellets acts as a fertile material and is converted into uranium 233 in the reactor core during operation. The pellets are 0.407″ in diameter and 0.500″ long and have a minimum of 90% theoretical density. The helium gas in each of the fuel tubes 60 is at 1 atmosphere standard temperature and pressure and furnishes the heat transfer bond between the pellet and the tubing wall.

Referring now to FIG. 17, curve 100 shows the percentage build-up the uranium 233 attains as a function of operating time at full power and curve 101 shows the percentage increase in reactivity as a function of operating time at full power due to uranium 233 build-up. It is apparent from these curves that the thorium which is being converted to uranium 233 is utilized in extending the useful life of the fuel element of the preferred embodiment. However, it should be pointed out that the applicant's invention contemplates the use of pellets which contain other fissionable material, such as plutonium or uranium 233 and further other fertile material, for example, uranium 238, could be utilized. The specific example described above is preferably about 90% enriched with uranium 235.

FIG. 18 shows the percentage change in reactivity as a function of boron 10 concentration where the upper abscissa is in total grams of boron 10 in the core and the lower abscissa is in grams boron 10 per cc.$\times 10^4$. This shows the amount of boron 10 needed for burnable poison and assuming all boron is subject to the average core flux then the prescribed amounts are given to change the reactivity by given percentage for the cold critical core or the hot critical core. Since the reactivity control of the nine control rods 49 shown in FIG. 2 is 15%, in order to have sufficient safety in the control rods it is necessary to obtain an additional 8.2% excess reactivity by burnable poisons built into the core of the reactor. To obtain this amount of control requires $2.7 \times 10^{-4}$ grams of boron 10 per cubic centimeter of core. This burnable poison may be included in several of the individual fuel tubes 60 or in the particular fuel tubes described with reference to FIGS. 15 and 16.

Although the preferred embodiment has been described in terms of a fuel assembly having 25 fuel pins in a square array it is within the purview of this invention to utilize a larger or lesser number of fuel pins and to arrange them in rectangular or other geometric arrays in accordance with the above described embodiments. Further, the present invention is not limited to the specific details of the particular embodiments described since many modifications will be apparent to those skilled in the art, the scope of the present invention being limited only by the appended claims.

What is claimed is:
1. A nuclear reactor fuel element assembly comprising a plurality of individual sealed fuel containing tubes, at least one clip means attached to each of said tubes intermediate the ends of said tubes, said clip means comprising a flat strip having a semi-circular central portion and laterally extending end portions, the inside diameter of said central portion engaging the fuel tube, said clip means being integrally connected at their end portions to form a linear group of spaced parallel tubes, a plurality of said groups, tab means intermediate the ends of said tubes connecting the outermost ends of said clip means of each group to form an assembly of spaced parallel groups, said tab means comprising substantially flat strips having parallel slots for receiving the clip ends, grid means connected to the respective ends of each of said tubes in said assembly, at least one removable fuel tube in said assembly, means for supporting said removable fuel tube in slidable relation with said clip means, and means for removably supporting said removable fuel tube at its ends.

2. The nuclear reactor fuel element of claim 1 wherein said removable tube contains a burnable poison.

3. The method of assembling a fuel element for a nuclear reactor comprising the steps of cutting a plurality of tubes to a predetermined length, securing at least one link on at least a portion of said tubes at a point intermediate the ends of said tube, securing an end fitting in one end of each of said tubes thereby sealing said tube ends, loading said partially closed tubes with fuel pellets and a heat transfer medium, sealing said other end of said tubes, interconnecting said links of a portion of said tubes so that a group of parallel spaced tubes is formed, interconnecting the end links of each of a plurality of gorups of said tubes to form an assembly of parallel spaced groups, securing end grids on each end of said assembly, securing a locating end fitting to one of said grids and a fuel handling fitting to the other of said grids.

4. A fuel element assembly comprising: a plurality of aligned groups of fuel tubes, each of said aligned groups comprising a plurality of individual fuel tubes having clip means intermediate the ends thereof for connecting said tubes in aligned and spaced relationship to each other, tabs attached to said clip means for interconnecting, spacing and laterally supporting said aligned groups in rectangular geometry to form a tube bundle, at least one of said fuel tubes being slidably and removably supported by said clip means, and end fittings at each end of said bundle, said end fittings including grid means receiving and supporting the ends of said fuel tubes in said tube bundle to maintain said spaced relationship of said fuel tubes and said aligned groups and provide removal and supporting means for said assembly, said grid means having means to disengagably receive and support said removable fuel tube.

5. The fuel element assembly of claim 4 wherein said removable fuel tube contains a burnable poison.

References Cited in the file of this patent

UNITED STATES PATENTS

| | | |
|---|---|---|
| 2,838,452 | West et al. | June 10, 1958 |
| 2,864,758 | Shackelford | Dec. 16, 1958 |
| 2,873,853 | Burton | Feb. 17, 1959 |
| 2,879,216 | Hurwitz et al. | Mar. 24, 1959 |
| 2,961,393 | Monson | Nov. 22, 1960 |
| 3,015,616 | Sturtz et al. | Jan. 2, 1962 |
| 3,037,924 | Creutz | June 5, 1962 |

OTHER REFERENCES

Nuclear Power, March 1958, pages 110–111.